C. L. BURGHER
Nov. 11, 1930. MEANS OF HEATING INCLOSURES ELECTRICALLY Re. 17,857
Original Filed Oct. 27, 1925
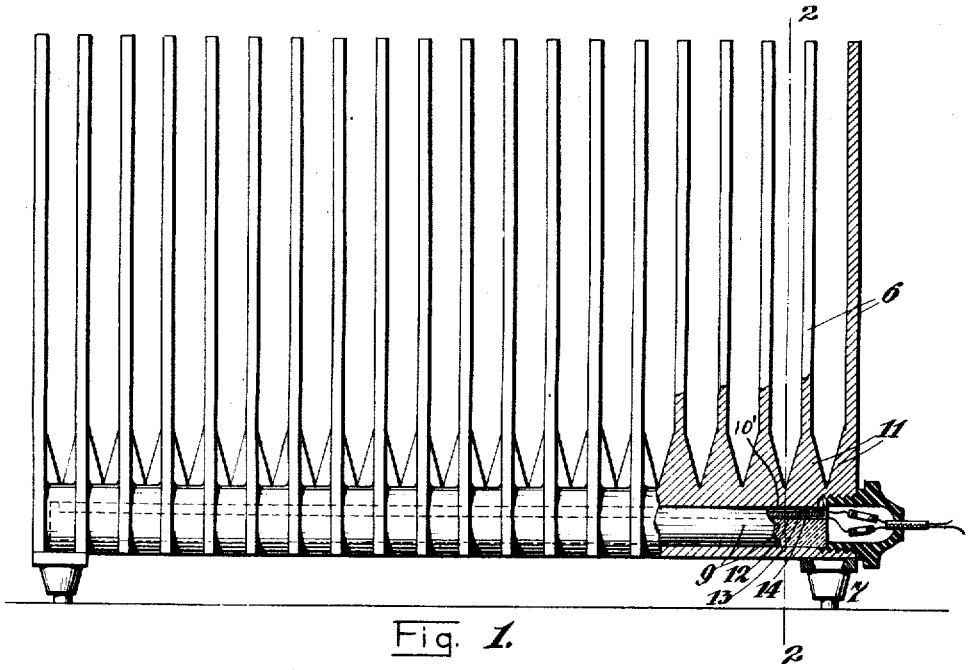
Fig. 1.
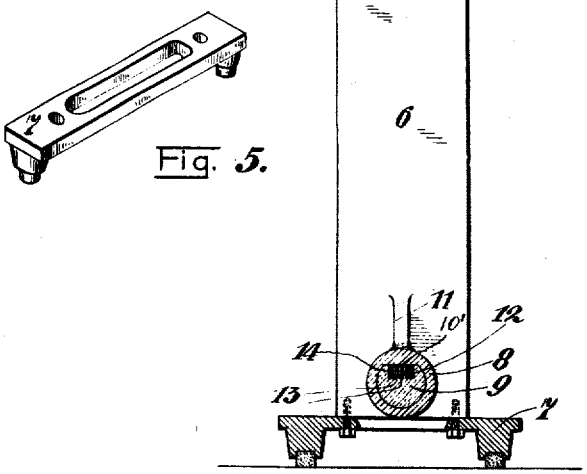
Fig. 2.
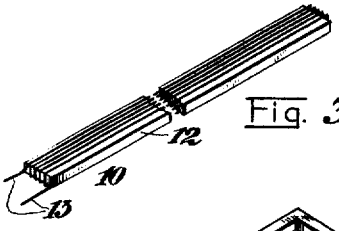
Fig. 3.
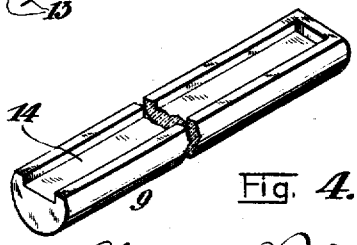
Fig. 4.
Fig. 5.
Clarence C. Burgher
INVENTOR Reissued Nov. 11, 1930

Re. 17,857

UNITED STATES PATENT OFFICE

CLARENCE L. BURGHER, OF NEW YORK, N. Y.

MEANS OF HEATING INCLOSURES ELECTRICALLY

Original No. 1,660,218, dated February 21, 1928, Serial No. 65,106, filed October 27, 1925. Reissue No. 17,386, dated July 30, 1929, Serial No. 366,074, filed May 24, 1929. This application for reissue filed September 26, 1930. Serial No. 484,863.

My invention relates to means of heating the rooms of buildings and other inclosures by conducting the heat produced by an electric current in a conductor of high resistance and small radiant area to radiant air-warming walls of large area and high heat conductivity, electrically insulated from the resistant, so that the high temperature and small radiant area of the resistant will be transformed into a large radiant area of moderate temperature.

To warm the air of an inclosure uniformly and economically to the moderate temperatures normally required in a dwelling for example, it is desirable first, that all the heat from the small resistant area should be conducted to the large radiant area before it is radiated; second that the temperature of the large radiant area should be moderate to avoid burning by contact therewith; third, that the radiant area should be as extensive as can be heated to the required temperature by the temperature and conduction area of the resistant employed; fourth, that the radiant area should be arranged so as to warm the air around it to as uniform a degree as possible; and fifth, that the radiant area should be so arranged as to cause the air warmed thereby to rise therefrom as quickly as possible, so as to cause a rapid and continuous circulation of cool air to and warm air from the radiant area.

I attain all these ends to the greatest degree possible, at the present time, by arranging the radiant area in the form of a series of vertical and parallel radiant plates of metal of high seat conductivity, such as aluminum, arranged transversely in line with the desired flow of air so that the cool air can pass laterally and from below between the parallel radiant plates, spacing and lengthening said plates vertically so that all the air passing between them will be as nearly as possible heated to the required temperature, and will then rise rapidly and continuously therefrom as through vertical ducts, so as to cause a rapid and continuous circulation of air to and from said ducts, and extending the heated resistant area lengthwise along and in contact with the lower ends of the series of transverse plates, so that all the heat will be transferred by conduction to the heated plates before it is transferred by convection to the air rising therebetween.

In order that my invention may be fully understood, I shall first describe in detail the mode in which I at present prefer to carry my invention into practice and then point out its various features in the claim.

Reference is to be had to the accompanying drawings forming part of this specification in which like parts are designated by the same numbers in all the figures.

Figure 1 is a longitudinal sectional elevation of a form of electric heater by which I at present prefer to carry out my invention.

Figure 2 is a cross-sectional elevation of the said heater on the line 2—2, Figure 1.

Figures 3 and 4 are detail views of parts of the electric heating resistant bar.

Figure 5 is a detail view of one of the end bases of the heater.

In the drawings, 6 designates a series of vertical and parallel plates, which constitute the radiant air ducts and which I prefer to arrange transversely, so that when the series is placed, for example, against the wall of of a room, the cool air flowing from the room toward the heater will pass directly between and in line with the plates to be heated thereby, and then rise therefrom. The radiant plates 6 are so spaced apart and proportioned transversely and vertically that all the air passing therebetween will be as nearly as possible heated to the desired temperature before it rises therefrom, and that the entire radiant area of the plates will be heated by the resistant throughout their width and length as nearly as possible to the temperature desired. This radiant temperature, in the case of a living room heater, may be about the same as that of an ordinary steam radiator, that is, about 225° F.

To support the radiator raised and in heat insulation from the floor, I prefer to use end bases 7, as shown in Figure 5, formed for convenience in manufacturing separately from the plates and attached thereto.

The radiant plates 6 are, by preference, cast integrally with and connected at their lower ends by a longitudinal tube 8 adapted to closely fit and receive the removable resistant bar 9, and in this instance, the upper and inner surface of the tube 8 as well as the upper surface of the resistant bar 9 is flattened, and the resistant bar 10 itself seated in the resistant bar 9 is flattened in a vertical direction, so as to bring the whole resistant heating area as closely as possible to the lower ends of the radiant plates 6 and thus prevent any unnecessary escape of heat from the resistant except by conduction through the tube 8 to the radiant plates 6. Also to this end I prefer at present to cover the top of the tube between each pair of adjacent plates 6, by longitudinal integrally cast webs 11, tapering upwardly and merging into the faces of the plates 6, so that the heat from the resistant between he plates 6 will be conducted by the webs 11 into the radiant plates.

In the present illustration of my invention, the resistant bar 10 is made of a thin flat bar of good heat-conducting but electrically insulating material, such as clay or alundum, around which is wrapped, in this case, lengthwise the resistant wire 13 of, by preference, nickel chromium.

The resistant bar 10 is then seated in a corresponding recess 14 in the resistant bar 9 which is of material such as clay, which insulates both heat and electricity, and the top of the resistant is covered by a sheet 10′ of electric insulating but heat conducting material, such as abestos or alundum, no thicker than is necessary to prevent escape of electricity from the wire 13 to the metallic tube 8 and plates 6.

As the resistant bar 10 extends across the lower ends of all the plates 6 and intervening webs 11 and is heat insulated both on the sides and bottom by the bar 9, and is in close heat conduction contact with the metallic tube 8 plates 6 and webs 11, nearly all the high heat of the small resistant area is transferred by conduction upwardly to the radiant plates 6, whose extensive radiant area on both faces is thus heated to the moderate degree desired and thus heats uniformly and moderately all the air flowing into the lower ends of the vertical radiant unobstructed ducts thus formed and rising therein, so as to cause a rapid and continuous circulation of air to and from the heater.

It is evident that many other means besides those described may be employed to carry out my new method of heating by electricity, without departing from the boundaries of my invention as defined by the claim following.

For example, the air-heating ducts need not be exactly vertical, but they should ascend as nearly as possible in accord with the natural ascent of the air therein and should be as free from obstructions to such ascent as possible.

Copper or brass, for example, being of higher conductivity than aluminum are preferable to aluminum for the radiant duct plates or walls except in the matter of cost. The duct walls may be of any suitable form or design in cross section or otherwise and may be united by other means than the integral webs 11 and tube 8 here shown. The electrical heating element consisting of the insulated wire resistant 13 sheathed in the tube 8 is illustrated as a well known and effective form of such heating element, but any other suitable form of electrical heating element may be used to heat the ascending duct walls, and it may be connected in any suitable way to any desired part thereof, it being important only that the heating element be electrically insulated from the duct walls, but in such heat-conducting relation thereto that the heat from the element will flow as quickly and with as little loss as possible directly to the duct walls, and from the duct walls in turn by convection to the air rising therebetween. The duct walls being of a height substantially greater than their width, the air will be progressively heated as it rises therebetween and will thus be quickly expelled and circulated therefrom with the resulting effectiveness and economy described.

I claim as my invention:

An electric heater consisting of a series of substantially unobstructed ascending air-heating ducts having heat-conducting walls of a length substantially greater than their width and an electrical heating element electrically insulated from but in direct heat-conducting relation to the duct walls.

In testimony whereof I hereby affix my signature.

CLARENCE L. BURGHER.

DISCLAIMER

Re. No. 17,857.—*Clarence L. Burgher*, New York, N. Y. MEANS OF HEATING INCLOSURES ELECTRICALLY. Patent dated November 11, 1930. Disclaimer filed December 10, 1932, by the patentee, said *Burgher, Duct Electric Heater Corporation* and *Duncan D. Sutphen, Jr.*, parties of interest.

Hereby enter the following disclaimer; to wit,

We hereby disclaim such a broad interpretation of the claim in our Letters Patent Re. No. 17,857 as would include all electric space heaters consisting of a series of ascending plates of any metal and form and an electrical heating element electrically insulated from but in direct heat-conducting relation to said plates, our invention being limited to an electric space heater consisting of a series of substantially unobstructed, ascending air-heating and circulating ducts having ascending walls of high heat conductivity, spaced apart and lengthened so that their length is at least several times the width of the space between them, and an electrical element electrically insulated from but in direct heat-conducting relation to the duct walls.

(*Official Gazette January 10, 1933.*)